United States Patent [19]

Kos et al.

[11] Patent Number: 5,525,141

[45] Date of Patent: *Jun. 11, 1996

[54] PROCESS FOR THE TREATMENT OF LIGHT METALS

[76] Inventors: Bernd Kos, Endresgasse 11; Harald Marhold, Stollenweg 11/10, both of A-8700 Leoben, Austria

[*] Notice: The term of this patent shall not extend beyond the expiration of Pat. No. 5,401,294.

[21] Appl. No.: 312,901

[22] Filed: Sep. 30, 1994

[30] Foreign Application Priority Data

Oct. 1, 1993 [AT] Austria ................................. 1973/93

[51] Int. Cl.⁶ ....................................................... C22B 7/00
[52] U.S. Cl. ............................................. 75/404; 75/672
[58] Field of Search ................................. 75/672, 10.21, 75/404

[56] References Cited

U.S. PATENT DOCUMENTS

| | | |
|---|---|---|
| 3,999,980 | 12/1976 | Montagna . |
| 4,040,820 | 8/1977 | Loach et al. . |
| 4,575,056 | 3/1986 | Julliard et al. . |
| 4,997,476 | 3/1991 | Lindsay et al. . |
| 5,080,715 | 1/1992 | Provencher et al. . |
| 5,401,294 | 3/1995 | Kos et al. ................................. 75/404 |
| 5,421,850 | 6/1995 | Dube et al. ............................ 75/10.21 |

FOREIGN PATENT DOCUMENTS

| | | |
|---|---|---|
| 0322207 | 6/1989 | European Pat. Off. . |
| 0892382 | 8/1953 | Germany . |
| 2228014 | 8/1990 | United Kingdom . |

Primary Examiner—Melvyn Andrews
Attorney, Agent, or Firm—Greenblum & Bernstein

[57] ABSTRACT

Process and apparatus for the treatment of light metals. The present invention pertains to a process for the treatment of mixtures of at least one light metal and at least one nonmetallic phase, formed of at least one oxide of a light metal, particularly of slag and waste metals for a subsequent process for the separation of the metallic phase as well as an apparatus for carrying out the process or the preparation of the mixture for disintegration, wherein the mixture, slag or waste metals and, if necessary, additions for the formation of a charge, are loaded into a treatment container or receptacle, overheated a maximum of 380° C. and the phases, via motion, are dispersed and/or held in dispersement, whereafter the homogenized charge, set up with the parameters for the subsequent process, is removed and subjected to separation.

16 Claims, 1 Drawing Sheet

5,525,141

PROCESS FOR THE TREATMENT OF LIGHT METALS

CROSS REFERENCE TO RELATED APPLICATIONS

This application claims the priority of Austrian Application No. A 1973/93, filed Oct. 1, 1993, the disclosure of which is incorporated herein by reference in its entirety.

BACKGROUND OF THE INVENTION

1. Field of the Invention

The invention pertains to a process for the treatment or preparation of mixtures comprised of at least one light metal, particularly aluminum, or an alloy of the at least one metal and at least one nonmetallic phase, formed of at least one oxide or one oxide coupling of the at least one metal, if necessary, with at least one additional material, for example salt or salt mixtures, particularly slag or dross resulting from processes for the production, processing as well as reclamation of aluminum and aluminum alloys, at higher temperature for a subsequent independent or separate process for the recovery or separation of the metallic phase from the nonmetallic phase via, if necessary, at least partial separation of the constituents of the metallic phase.

In addition the invention pertains to an apparatus for the treatment or preparations of mixtures consisting of at least one light metal, particularly aluminum, or an alloy of the at least one metal and at least one nonmetallic phase, formed of at least one oxide of the at least on metal, if necessary, with at least one additional material, for example salt or salt mixtures, particularly slag or dross resulting from processes for the production, processing as well as reclamation of aluminum and aluminum alloys, at higher temperatures for a subsequent process for the recovery or separation of the metallic phase from the nonmetallic phase via an at least partial separation of the constituents of the nonmetallic phase, including essentially a container having at least one opening for charging the mixture and/or slag as well as, if necessary, additional materials, and for the discharge of the formed homogenized charge particularly for carrying out the process.

2. Discussion of the Background of the Invention and Material Information

During substantially all processes for the production, reclamation, processing and the like of light metals, particularly aluminum and aluminum alloys, large quantities of waste materials often result, such as for example, slag, dross, mixtures and the like, which in addition to the nonmetallic phase also contain metal, possibly at a high fraction. Light metals have, on one hand, a high affinity for oxygen and nitrogen and thus form strong high melting point oxides and nitrides, particularly during the use of technical melting and remelting processes when carried out in air, and on the other hand the difference in the specific weight between the metal phase and the nonmetallic phase or the reaction products is small. In connection with the interfacial tensions the previously noted chemical and physical properties of light metals, are the reason why a separation of the nonmetallic and the metallic phase, even when the latter is present in the mixture in liquid form, is difficult and not workable in the required scale. A reclamation of the metal, respectively a demetallization of the waste materials, appears however to be of great interest not only from the economic standpoint, but to an increasing extent ecological aspects and constantly more stringent environmental laws are becoming more important.

A large number of processes and devices for the phase separation or reclamation of metals from mixtures, such as slag and dross, have already been proposed and described. These are based substantially on that a coagulation of the finely dispersed metal or the fine droplets in the molten state should flow together into larger aggregates that can then be removed.

To that end it has become known that the stirring of the mixture causes a coagulation of the metallic particles. The stirring can therewith be the result of stirring means or can be practiced in a rotating container. European Patent Publication EP-A2-0322207, for example, teaches a process, in which in a rotating container, into which dross was charged in the cold state, is heated to a temperature above the melting point of the metal, with a plasma burner. The thereby agglomerated metal must then be removed through tapping holes in the drum wall and the substantially nonmetallic phase is scraped from the container wall with a tool. U.S. Pat. No. 4,997,476 and British Patent Publication GB-A-2 228 014 describe a further process wherein a container rotates about its vertical axis, which again is heated with a plasma burner, whereby, after extensive treatment times of the charged dross, a discharge of liquid metal is said to be possible. It was also attempted, as set forth in U.S. Pat. No. 4,575,056, to press out molten aluminum from hot dross. Centrifugal processes with essentially continuous and discontinuous procedures are also known. Such centrifugal processes and devices however have the inherent problem, that the differences in the specific weight of the metallic and nonmetallic phases is often quite small and that a centrifugal separation thus requires very specific working procedures.

All of the processes, developed to date, for the separation of the metallic phase of light metals from at least one nonmetallic phase containing these same light metals have the common disadvantage that separation or a demetallization is not accomplished in a sufficiently high extent, so that particularly the ecological problems of high deposit costs and the ecological recyclability of the residue remain largely unsolved.

SUMMARY OF THE INVENTION

Here the invention provides a remedy and has the goal to provide a process for the treatment of fine mixtures of light metal and at least one nonmetallic phase, which permits a high degree of separation in a subsequent demetallization process. In addition, it is a main goal of this invention to provide an apparatus via which a fine mixture of metallized phases can be prepared for a subsequent process having a high degree of demetallization.

This goal is so achieved in a process of the previously described type, wherein the mixture, slag and/or dross and, if necessary, additions are entered in a treatment or preparation receptacle during the formation of a charge. Heat energy is supplied to the charge in any known manner and the charge is overheated a maximum of 380° C., that is it is brought to a temperature that lies between the melting temperature of the metallic phase and one that exceeds same by 380° C. and is set at this temperature with a temperature distribution having only small fluctuations or differences and that the phases of the charge are dispersed or held in a dispersed stage via motion, whereafter the homogenized charge, set up with the parameters for a subsequent process, is brought from the treatment or preparation receptacle into a disintegration apparatus for carrying out the separation of the metallic phase.

A further task of the invention is achieved with a generic type of apparatus in that the treatment or preparation receptacle has, in the reception space for the charge, at least one means for the motion, circulation or mixing thereof, and/or includes operating means for its own motion.

The advantages achieved by means of this invention particularly reside in the fact the phase mixture for a subsequent disintegration is so prepared, that substantially complete demetallization can be achieved. At the same time, it is possible to utilize slag, dross or the like, that result from metallurgical processes such as melting, remelting or melting refining, in warm or lukewarm states, that is directly resulting from the process, without the substantial oxidation of the metallic mass or its reaction with nitrogen. Further additions, such as chips, grinding or filing dust, as well as fine lumps of scrap, intermixed with nonmetallic phases can also be added to the charge in the preparation receptacle. It is important that heat energy be added to the charge if this is required for the subsequent disintegration process, whereby, however, overheating should be a maximum of 380° C., since higher temperatures are detrimental to the consistency of the mixture and the behavior of the metallic phase. In order to achieve uniform conditions in the entire charge for the reciprocal action of metallic-nonmetallic phases, a very uniform temperature distribution, with small differences, is required in order, via a predetermined movement, to homogeneously disperse or keep the phases in a homogeneously dispersed state. Surprisingly, and against the prejudices of those skilled in the art, it was determined, that a homogeneous charge, in which the phases are in a dispersed state, can be disintegrated substantially better, easier and more quickly. The reasons therefore have not yet been fully determined, however, it is assumed, that the impact-initiated movement, on one hand increases the distance between the nonmetallic particles, that is the internal porosity of the charge is increased, while on the other hand, the smallest metallic particles, by overcoming the interfacial tension via the gap increase, can coagulate into droplets, whereby particularly favorable conditions result in the charge for a subsequent substantially complete separation of the metallic phase. It can be advantageous to add, during the formation of the charge, scrap aggregates having nonmetallic additions and/or additional materials, for example, fluxes, into the preparation receptacle and that heat energy is added to the charge.

Thereby, it is possible, in a simple manner, to achieve particularly favorable parameters for a subsequent disintegration process. The addition of the heat energy can be accomplished in any known manner via a burner or via heat emission. At the same time, it is preferred that the charge be brought to a temperature of at least 5° C., preferably to a range of 100° C. to 200° C., and particularly to about 200° C., over the melting temperature of the metallic phase, since at these temperatures, and via a uniform temperature distribution, particularly favorable homogenization conditions are achieved.

As is deemed favorable, when the charge is brought to or held at higher temperatures, particularly at temperatures above the melting point of the metallic phase, under a protective gas, the formation of nonmetallic components is substantially reduced and the metal removal, during the subsequent disintegration process, is increased.

For the accumulation of mixtures from several melting positions as well as for the economical filling, particularly at unheated disintegration devices, it has been determined that it is especially advantageous when the homogeneous charge is removed from the preparation receptacle in portions.

An apparatus of the previously-described type for the preparation of mixtures, consisting of light metal and at least one nonmetallic phase, at higher temperatures, which in accordance with the invention is characterized in that the reception space for the charge includes at least one means for movement, circulation or the mixture thereof, and/or is itself moveable via drive means, and has the advantage that the thus achieved movement of the charge disperses same and/or holds same in a dispersed state and further homogenizes same. At the same time, there is obviously, it is assumed, a loosening of the nonmetallic individual particles and an accumulation of the metallic particles in the intermediate spaces is achieved, whereby a following or subsequent disintegration can be accomplished substantially more advantageously and efficiently. If the charge is brought into motion or movement, via impacts, via the rotation of movement means or the preparation receptacle is subjected to rotations of between 5 and 40, particularly about 15, revolutions per minute, it has been determined that particularly favorable conditions are achieved for the regulation of homogenized mixtures. It is especially simple and advantageous therefore, if the preparation receptacle can rotate about its longitudinal axis and/or is tiltable about a horizontal axis and if the reception space for the charge can be heated, for example, via a burner. It is however also possible to heat the charge via heat emissions by means of heated emission areas in the reception space or, due to its high metallic content, to heat same via induction, which furthers the coagulation of the metallic phase into droplets. The receptacle wall can be made of heat resistant alloys. For better temperature equalization of the charge however, a cladding, consisting essentially of an oxide of a light metal is advantageous. Particularly, in view of an advantageous material flow during the homogenizing preparation of mixtures for subsequent demetallization, it has been determined that it is advantageous when the preparation container, which is rotatable about its longitudinal axis and pivotable about a substantially horizontal pivot bearing into a substantially vertical axis position, can be positioned such that the opening of the reception space is upwardly directed and is charged via auxiliary devices, whereafter the desired material and temperature parameters are set for the charge for the subsequent process when the turning axis is in a substantially horizontal position, whereafter the homogenized mixture is substantially discharged toward the bottom and preferably directly brought into a demetallization apparatus. Such a treatment arrangement has the advantage of compact construction and economical operation since extensive transport means are not required.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
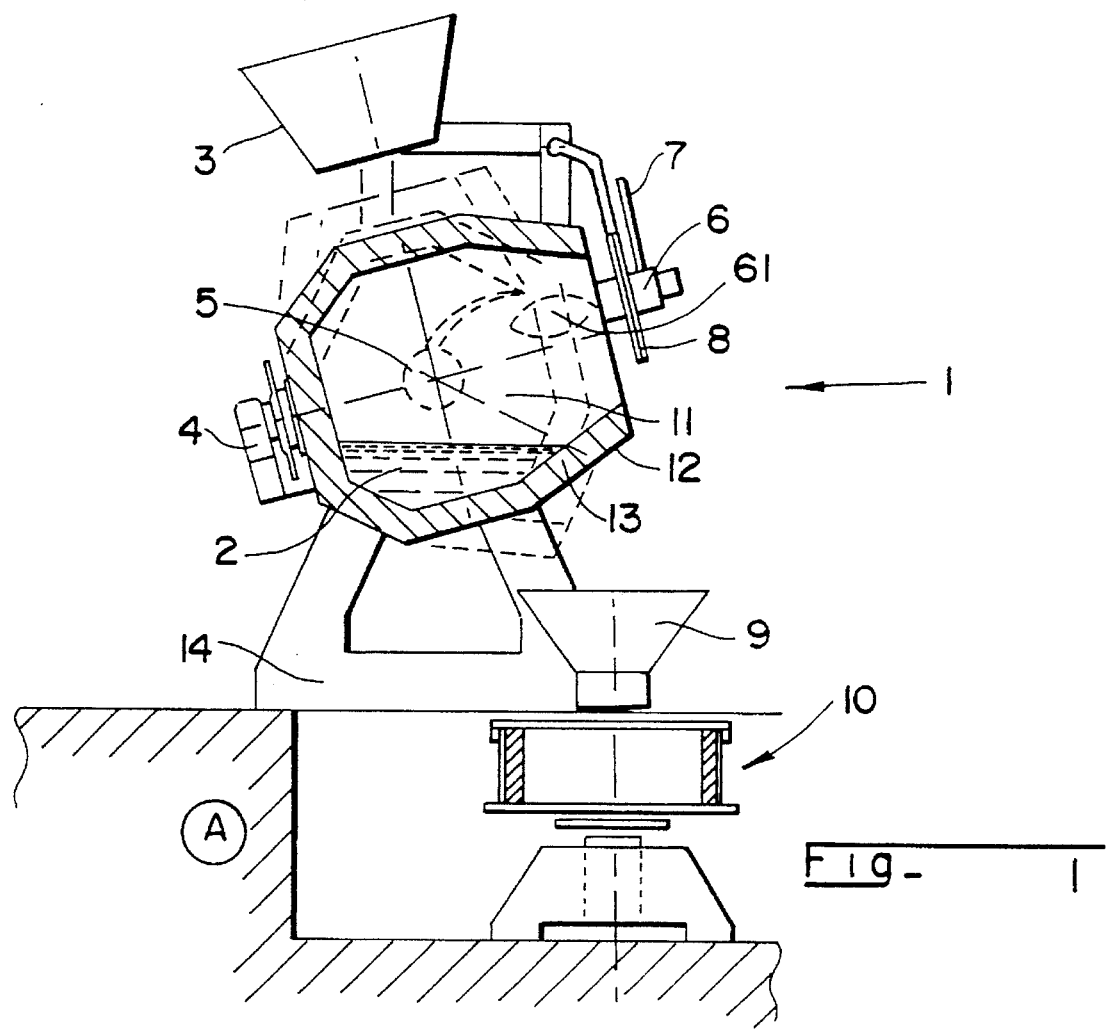
FIG. 1 schematically shows a vertical partial section of a treatment unit or installation of this invention.
Figure 2:
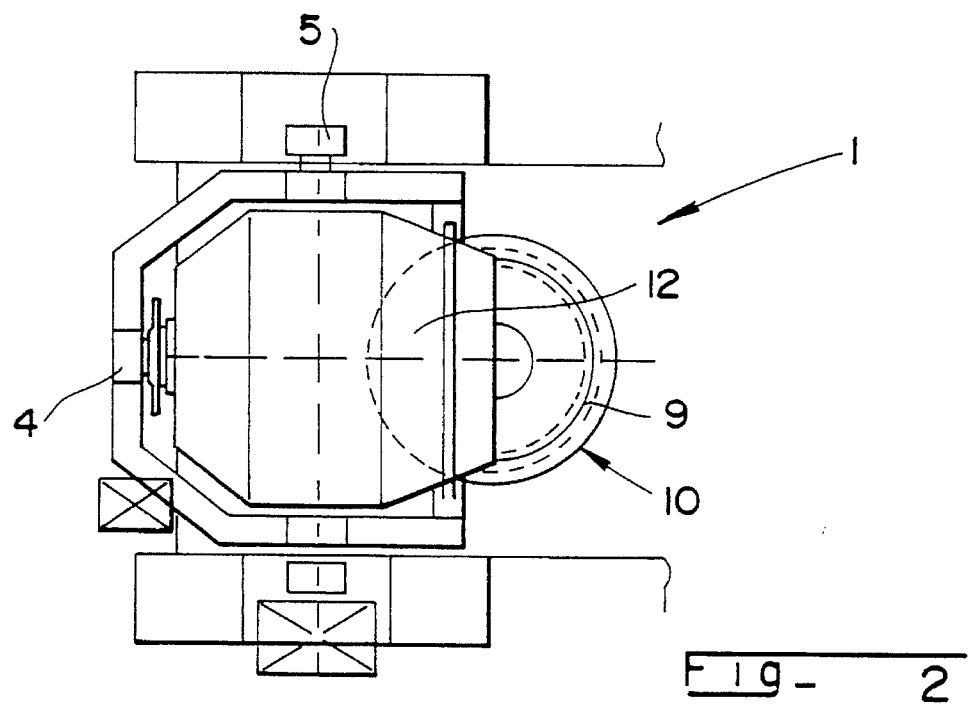
FIG. 2 shows a top plan view of the installation.

A treatment container or receptacle 12 of a treatment unit 1 is shown in FIG. 1 in section and includes a layer of masonry, a wall, or a casing 13 of a reception space 11 for a charge 2. Casing 13 can include projections in the direction of the turning axis, or an agitator apparatus (not illustrated) can be inserted in the reception space 11 for movement of the charge. Receptacle 12, via bearing or drive means 4, is rotatable about its longitudinal axis, whereby receptacle 12, via a pivot pin or bearing 5, can be set so its opening is upwardly directed (as shown by the broken lines in FIG. 1) and for example can be charged with dross, via a funnel or auxiliary device 3. Pivot pin 5 is arranged on a frame 14 which in turn is supported on a foundation A. Foundation A also carries, for example, a disintegration apparatus 10, such as a centrifuge, for the demetallization of the mixture, whereby a controlled input can be achieved via an inlet or supply apparatus 9.

As best shown in FIG. 1, charge 2 is capable of being heated with a burner 6, such as for example via a plasma flame 61. The apparatus of this invention also includes setup devices 7 which further include means for the introduction of a protective gas into reception space 11 and preferably a cover 8 is utilized for maintaining the protective gas atmosphere in container 12.

Wall or casing 13, which is at least partially in contact with charge 2, is made of a heat-resistant material, preferably of a heat resistant alloy, such as an oxide of light metal. In the formation of charge 2, scrap, preferably sand-containing or dust-containing metalworking scrap, such as grinding dust or sand blasting ablations are also included with part of the scrap which often also includes fine lumps of nonmetallic additions.

The function or action of the apparatus of this invention, that is the treatment unit or installation was checked by means of tests or experiments.

Test 1

An approximately spherical, rotatable and pivotable homogenizer, having a round input and output opening, was utilized. The homogenizer had an inner diameter of 700 mm whose outer casing consisted of a 50 mm thick insulation mass and an internally attached and directed layer of a 70 mm thick high alumina fire proof material. In addition, inset in the casing were two rows of four hub or stroke elements each, which relative to each other, were offset, in their arrangement, in the direction of rotation.

40 kg of dross of an Al/Mg/Si - alloy, having a metallic content of about 70% were utilized. The temperature of the dross at charging was 620°+/−20° C. and the temperature of the homogenizer was about 800° C. The temperature was raised to 850° C. via a natural gas/$O_2$ burner, whereby a unitary composition as well as temperature distribution were achieved via the rotation of the homogenizer. The time extent of this procedure was 8 minutes. After about two thirds of this time period, 0.05 kg of a salt mixture was added to the charged products. The dross, treated or prepared in this manner, was thereafter removed from the homogenization unit and brought directly into an apparatus for disintegration and treated therein. A metal recovery of 94% was achieved, wherein a metal ring, obtained via centrifugal separation had a purity of 99.2% (metal content). In contrast to a comparison test without the preparation of the dross in a homogenizer (only via static prior treatment), an increase in the metal recovery of 5% and an increase of the purity of the light metal alloy from 97.7% to 99.2% was achieved.

Test 2

The experimental arrangement as well as the process conditions conformed to the description thereof in Test 1. The charge material consisted of 40 kg of dross, from a melting process for an intermediate or master magnesium alloy. Since however there was a demand that the recovered light metal or the light metal alloy be used in a further process for alloys with low magnesium content, 4 kg of pure aluminum shavings, which had accumulated as a waste product in a mechanical working process, were added to the dross and the mixture was treated. Subsequently thereto, the resulting mixture was removed from the treatment receptacle and again brought into a disintegration apparatus. The purity of the resultant light metal was 99.4% and the metal recovery was 95%.

Test 3

An approximately pear-shaped, rotatable and pivotable homogenizer was utilized having a largest inner diameter of 2000 mm and a length of 2500 mm. The casing consisted of 30 mm thick insulating plate, and an internally attached and directed layer of 170 mm thick high alumina fire proof material. In addition, inset in the casing were four rows of six hub or stroke elements each, which relative to each other, were each offset ⅓ of the distance of the elements with respect to their arrangement in the direction of rotation. Thereby, a most effective and thorough mixing of the charged material was achieved. Without the use of the hub or stroke elements a disadvantageously acting partial unmixing of the metallic phase and the nonmetallic phase occurred. 750 kg of dross from a melting process for 99.7% aluminum, with a temperature of 620+/−20° C. and an aluminum content of about 65% were utilized. Via the use of a natural gas/$O_2$ burner the temperature was raised to 860° C. with the length of this process step being 25 minutes. Shortly before the removal of the charge from the treatment container, and the inlet into the disintegration apparatus, 1.6 kg of a flux material were added. The resultant metallic recovery was 97%, which is an increase of 9% in contrast to the process with only a static prior treatment. The purity of the resultant aluminum was 99.3%, whereas with the static prior treatment an aluminum content of 98.4% was achieved.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A process for one of the treatment and preparation of mixtures comprised of one of at least one light metal, and an alloy of the at least one metal and at least one nonmetallic phase, formed of one of at least one oxide and one oxide coupling of the at least one metal, if necessary with at least one additional material including one of salt and salt mixtures in the form of one of slag and dross resulting from processes for the production, processing as well as reclamation of light metals, at higher temperature for a subsequent one of an independent and separate process for one of the recovery and separation of a metallic phase from a nonmetallic phase via, if necessary, the at least partial separation of the constituents of the metallic phase, the process comprising:

forming a charge by placing the mixture of at least one of slag and dross and, if necessary further additions, into one of a treatment and preparation container;

supplying heat energy to the charge;

overheating the charge a maximum of 380° C. by bringing same to a temperature between the melting temperature of the metallic phase and a temperature that is 380° C. above the melting temperature;

obtaining, at this temperature, a temperature distribution having only minor variations;

moving one of the charge and preparation container so that the phases of the charge can be one of dispersed and held in dispersement;

setting up a homogenized charge with parameters for a subsequent process;

removing the homogenized charge from the preparation container;

supplying the homogenized charge to a disintegration apparatus; and subjecting the homogenized charge to a separation of the metallic phase.

2. The process of claim 1 wherein the light metal is aluminum.

3. The process of claim 1, wherein the further additions forming the charge include scrap, at least one of sand and dust containing metalworking scrap including at least one of grinding dust and sand blasting ablations, with part of the scrap further including fine lumps of nonmetallic additions.

4. The process of claim 3, wherein the forming of the charge includes further nonmetallic materials, including at least one of oxides and fluxing agents.

5. The process of claim 1 including, adding heat energy to the charge, via at least one burner.

6. The process of claims 4, wherein the adding of the heat energy is accomplished via emission from an emission body extending into the treatment container.

7. The process of claim 1 further includes bringing the charge to one of a temperature of at least 5° C. and in the range of 100° C. to 250° C. over the melting temperature of the metallic phase.

8. The process of claim 7 wherein the temperature is about 200° C.

9. The process of claim 1 further including homogenizing the charge, at an essentially uniform temperature distribution with differences of a maximum of under 50° C.

10. The process of claim 9 wherein the maximum is under 20° C.

11. The process of claim 1 further including rotating the treatment container about a longitudinal axis at a speed of between 5 and 40 revolutions per minute.

12. The process of claim 11 wherein the speed is between 10 and 30 revolutions per minute.

13. The process of claim 11 wherein the speed is about 15 revolutions per minute.

14. The process of claim 1 wherein the overheating takes place in a protective gas atmosphere.

15. The process of claim 9 further including, after the step of setting up a homogenized charge, bringing the charge into the disintegration apparatus in one of wholly and in portions.

16. The process of claim 9 further including, after the step of setting up a homogenized charge, bringing the charge into an unheated disintegration apparatus, with the apparatus having at least partially cooled inner walls.

\* \* \* \* \*